United States Patent
Karube et al.

(10) Patent No.: US 8,668,040 B2
(45) Date of Patent: Mar. 11, 2014

(54) SUPERCHARGER-EQUIPPED INTERNAL COMBUSTION ENGINE FOR SADDLE-RIDE TYPE VEHICLE

(75) Inventors: Shinichi Karube, Wako (JP); Takaaki Shomura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 649 days.

(21) Appl. No.: 12/628,386

(22) Filed: Dec. 1, 2009

(65) Prior Publication Data

US 2010/0175946 A1    Jul. 15, 2010

(30) Foreign Application Priority Data

Jan. 13, 2009   (JP) .................................. 2009-004917

(51) Int. Cl.
*F02B 33/00*   (2006.01)
*B60K 5/04*    (2006.01)

(52) U.S. Cl.
CPC .. B60K 5/04 (2013.01); F02B 33/00 (2013.01)
USPC ........ 180/291; 123/563; 123/198 E; 123/564; 418/55.1

(58) Field of Classification Search
CPC ............................ F01C 11/008; F02M 35/162
USPC ........................ 180/291; 123/559.1, 563, 564
See application file for complete search history.

(56) References Cited

U.S. PATENT DOCUMENTS

| | | | | |
|---|---|---|---|---|
| 801,182 | A * | 10/1905 | Creux ........................... | 418/142 |
| 4,192,152 | A * | 3/1980 | Armstrong et al. ............. | 62/402 |
| 7,832,383 | B2 * | 11/2010 | Ozaki et al. .................... | 123/564 |
| 8,061,467 | B2 * | 11/2011 | Takeshima et al. ........... | 180/291 |
| 8,186,333 | B2 * | 5/2012 | Sakuyama ................. | 123/559.1 |

FOREIGN PATENT DOCUMENTS

| | | |
|---|---|---|
| JP | 2007-211712 A | 8/2007 |
| JP | 2007-247518 | 9/2007 |
| JP | 2007-533890 A | 11/2007 |
| JP | 2007-321568 A | 12/2007 |
| JP | 2008-240520 A | 10/2008 |

* cited by examiner

*Primary Examiner* — J. Allen Shriver, II
*Assistant Examiner* — Brian Cassidy
(74) *Attorney, Agent, or Firm* — Squire Sanders (US) LLP

(57) ABSTRACT

An internal combustion engine for a vehicle can include a crankcase, and a supercharger disposed behind the crankcase in a front-to-rear direction of the vehicle body. A throttle body and an intercooler are connected in the front-to-rear direction, to an intake passage of the engine. The intake passage extends a rearward from a cylinder head, and the cylinder head protrudes substantially upward from the crankcase. The throttle body and the intercooler are connected in this order, in the front-to-rear direction.

12 Claims, 7 Drawing Sheets

SUPERCHARGER-EQUIPPED INTERNAL COMBUSTION ENGINE FOR SADDLE-RIDE TYPE VEHICLE

BACKGROUND

1. Field

The present invention relates to a supercharger-equipped internal combustion engine to be mounted on a saddle-ride type vehicle on which a driver rides by straddling a seat, such as a saddle-ride type two-wheel vehicle, three-wheel vehicle or four-wheel vehicle (rough terrain vehicle) or a personal watercraft.

2. Description of the Related Art

To ride on a saddle-ride type vehicle, a driver straddles a seat. Having such form of a vehicle body, a saddle-ride type vehicle has a small limited space for installing devices including an internal combustion engine. For this reason, in a supercharger-equipped internal combustion engine in particular, it is not easy to secure a space for installing a supercharger as well as an intercooler which cools air compressed by the supercharger, and the like.

Heretofore, a personal watercraft has been disclosed as an example of a saddle-ride type vehicle on which a supercharger-equipped internal combustion engine is mounted.

The personal watercraft disclosed, for example, Japanese Patent Publication No. 2007-247518 (JP '518) has a body which is formed of a hull, and a deck covering the hull from above. At the center of the deck a little closer to the rear, a rectangular opening protruding upward is covered by a saddle seat long in a front-to-rear direction and narrow in a left-to-right direction.

In such a personal watercraft, a supercharger-equipped internal combustion engine is mounted on or in an engine room which is located under the seat and is surrounded by the hull and the deck.

In the supercharger-equipped internal combustion engine, an intake passage extends rearward of an internal combustion engine main body from a supercharger provided at the left lateral side of the internal combustion engine main body, and is connected to an intercooler provided behind the internal combustion engine main body. Moreover, another intake passage extends from the intercooler toward the right lateral side of the internal combustion engine main body, and is connected through a throttle body to an intake manifold provided in a protruding manner at the right side of a cylinder head.

As described above, the supercharger-equipped internal combustion engine disclosed in JP '518 has such a structure that the supercharger is provided to protrude toward the left side of the internal combustion engine main body, that the intake manifold extends toward the right side of the internal combustion engine main body, and that the throttle body is placed behind the intake manifold. Due to such a structure, the internal combustion engine is large in a body-width direction, and therefore the sheet size of the saddle seat covering the internal combustion engine from above is also wide in the left-to-right direction. For this reason, a driver has to sit down with his/her legs wide apart.

It is desired to reduce the size, in a width direction, of a vehicle such as a motorcycle and a rough terrain buggy. Thus, it is difficult to employ the layout as disclosed in the example of JP '518.

Embodiments of the present invention have been made in view of the above points, and has an object to provide a supercharger-equipped internal combustion engine for a saddle-ride type vehicle formed in such a small size in a width direction of a vehicle body as to be accommodated in a space of a saddle sheet of the saddle-ride type vehicle, the space being narrow in a left-to-right direction.

SUMMARY

A first embodiment of the present invention provides a supercharger-equipped internal combustion engine for saddle-ride type vehicle mounted on a saddle-ride type vehicle. The engine includes a crankcase, and a supercharger is provided behind the crankcase in a front-to-rear direction of a vehicle body. A throttle body and an intercooler are connected, in this order in the front-to-rear direction, to an intake passage extending rearward from the cylinder head protruding substantially upward from the crankcase.

A second aspect of the present invention provides the supercharger-equipped internal combustion engine for saddle-ride type vehicle according to the first aspect. The intercooler can be placed between the throttle body located before the intercooler and an air cleaner located behind the intercooler, and is placed. between left and right paired frames of a vehicle body frame of the vehicle body, the left and right paired frames being oriented in the front-to-rear direction of the vehicle.

A third aspect of the present invention provides the supercharger-equipped internal combustion engine for saddle-ride type vehicle according to any one of the first and second aspects, wherein the supercharger can include a scroll compressor placed behind a crankshaft, and the intercooler is placed above the supercharger.

A fourth aspect of the present invention provides the supercharger-equipped internal combustion engine for saddle-ride type vehicle according to any one of the first to third aspects. The intercooler can include an intercooler core chamber housing an intercooler core, and an expansion chamber serving as an air chamber.

A fifth aspect of the present invention provides the supercharger-equipped internal combustion engine for saddle-ride type vehicle according to the fourth aspect. The expansion chamber can be provided with a pressure regulating valve which returns air from the expansion chamber of the intercooler for the supercharger to an upstream of the supercharger, when an air inlet pressure between the supercharger and the throttle body becomes a predetermined value or higher. A recirculation valve returns air from the expansion chamber to the upstream of the supercharger, upon closure of a throttle valve of the throttle body.

According to the supercharger-equipped internal combustion engine for saddle-ride type vehicle of the first aspect, the supercharger is provided behind the crankcase of the internal combustion engine in the front-to-rear direction of the vehicle body, and below the saddle seat, the throttle body and the intercooler are connected, in this order in the front-to-rear direction, to the intake passage extending rearward from the cylinder head protruding substantially upward from the crankcase. In this way, the supercharger, the throttle body and the intercooler are collectively arranged behind the internal combustion engine main body. This reduces the width of the supercharger-equipped internal combustion engine in the left-to-right direction, and allows the supercharger-equipped internal combustion engine to be accommodated in a space of the saddle seat of a saddle-ride type vehicle, the space being narrow in the left-to-right direction. Consequently, a driver easily takes a stable sitting posture in riding on the saddle.

Here, the throttle body and the intercooler are connected, in this order in the front-to-rear direction, the intake passage extending rearward from the cylinder head. This suppresses an increase in the length in the front-to-rear direction of the supercharger-equipped internal combustion engine as much as possible, and thereby enables a reduction in the size of the supercharger-equipped internal combustion engine.

According to the supercharger-equipped internal combustion engine for saddle-ride type vehicle of the second aspect, the intercooler is placed between the throttle body located before the intercooler and the air cleaner located behind the intercooler, and is placed, in a plan view, between the left and right paired frames of the vehicle body frame of the vehicle body, the left and right paired frames being oriented in the front-to-rear direction of the vehicle. In this manner, the devices of the inlet system are arranged behind the cylinder head in the order of the throttle body, the intercooler and the air cleaner, and are thus long in the front-to-rear direction and narrow in the left-to-right direction. This allows the devices to be placed between the left and right paired frames oriented in the front-to-rear direction, and to be accommodated easily in the space of the saddle seat, which is narrow in the left-to-right direction.

According to the supercharger-equipped internal combustion engine for saddle-ride type vehicle of the third aspect, the supercharger is a scroll compressor and is placed behind the crankshaft, and the intercooler is placed above the supercharger. Accordingly, the intercooler is arranged by using a dead space which is formed under the saddle seat and above the supercharger. This makes it possible to reduce the length in the front-to-rear direction as well as the width in the left-to-right direction, of the supercharger-equipped internal combustion engine.

According to the supercharger-equipped internal combustion engine for saddle-ride type vehicle of the fourth aspect, the intercooler is formed of the intercooler core chamber housing the intercooler core, and the expansion chamber serving as an air chamber. Accordingly, it is possible to allow the intercooler to also function as an air chamber, and thus to constantly send stably-pressurized air to the internal combustion engine.

According to the supercharger-equipped internal combustion engine for a saddle-ride type vehicle of the fifth aspect, the expansion chamber is provided with: the pressure regulating valve which returns air from the expansion chamber of the intercooler for the supercharger to the upstream of the supercharger, when an air inlet pressure between the supercharger and the throttle body is not less than the predetermined value; and the recirculation valve which returns air from the expansion chamber to the upstream of the supercharger, when the throttle valve of the throttle body closes. In this way, the pressure regulating valve and the recirculation valve are directly provided to the expansion chamber from which these valves take out air to be returned to the upstream of the supercharger. This makes it possible to simplify the air return passage, and thus to simplify the layout of the inlet system.

DETAILED DESCRIPTION OF THE PREFERRED EMBODIMENTS

Hereinbelow, an embodiment according to the present invention will be described, with reference to FIGS. 1 to 7.

Figure 1:
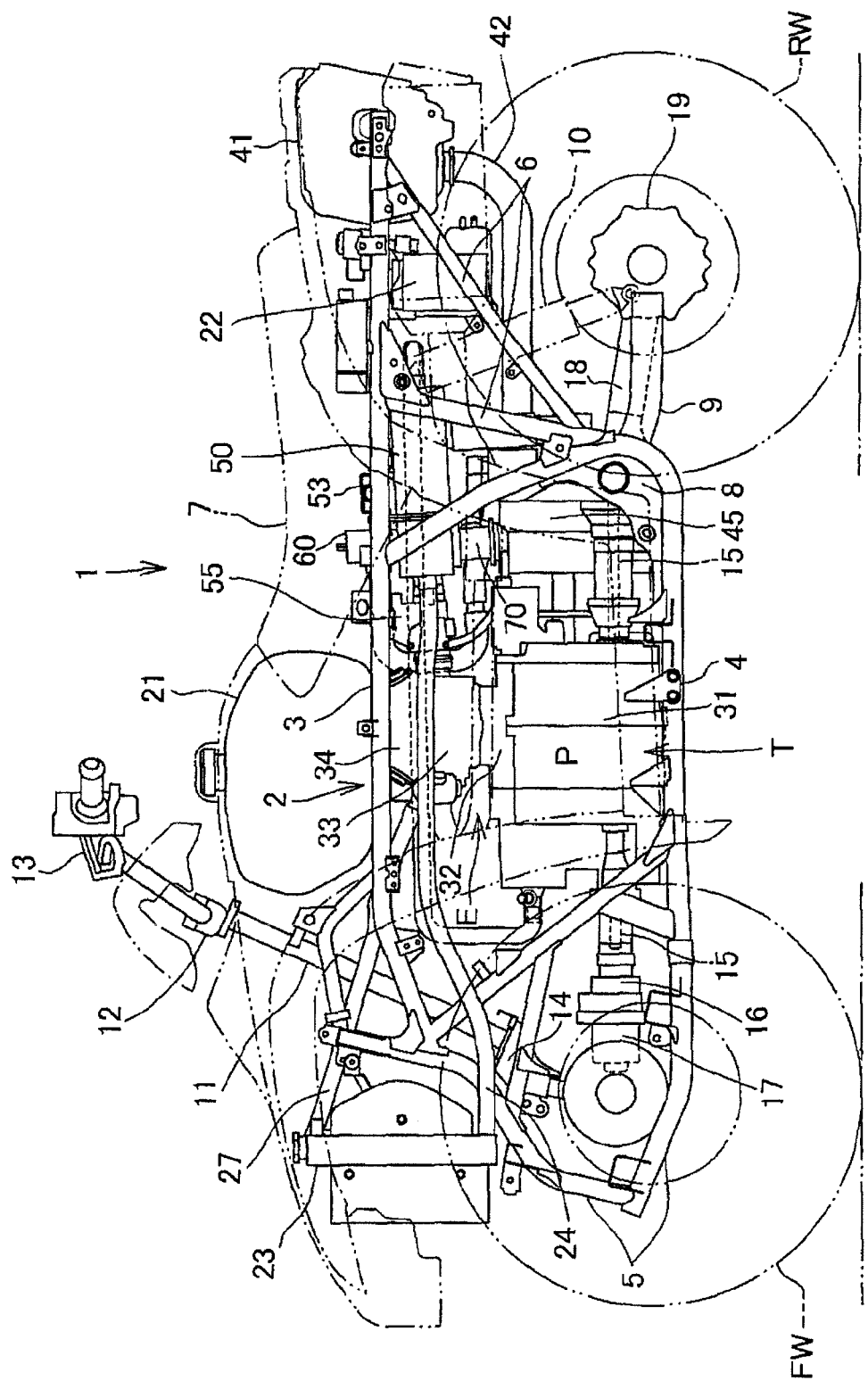
FIG. 1 is a side view of a rough terrain vehicle provided with a supercharger-equipped internal combustion engine according to an embodiment of the present invention, with its vehicle body cover and the like detached.
Figure 2:
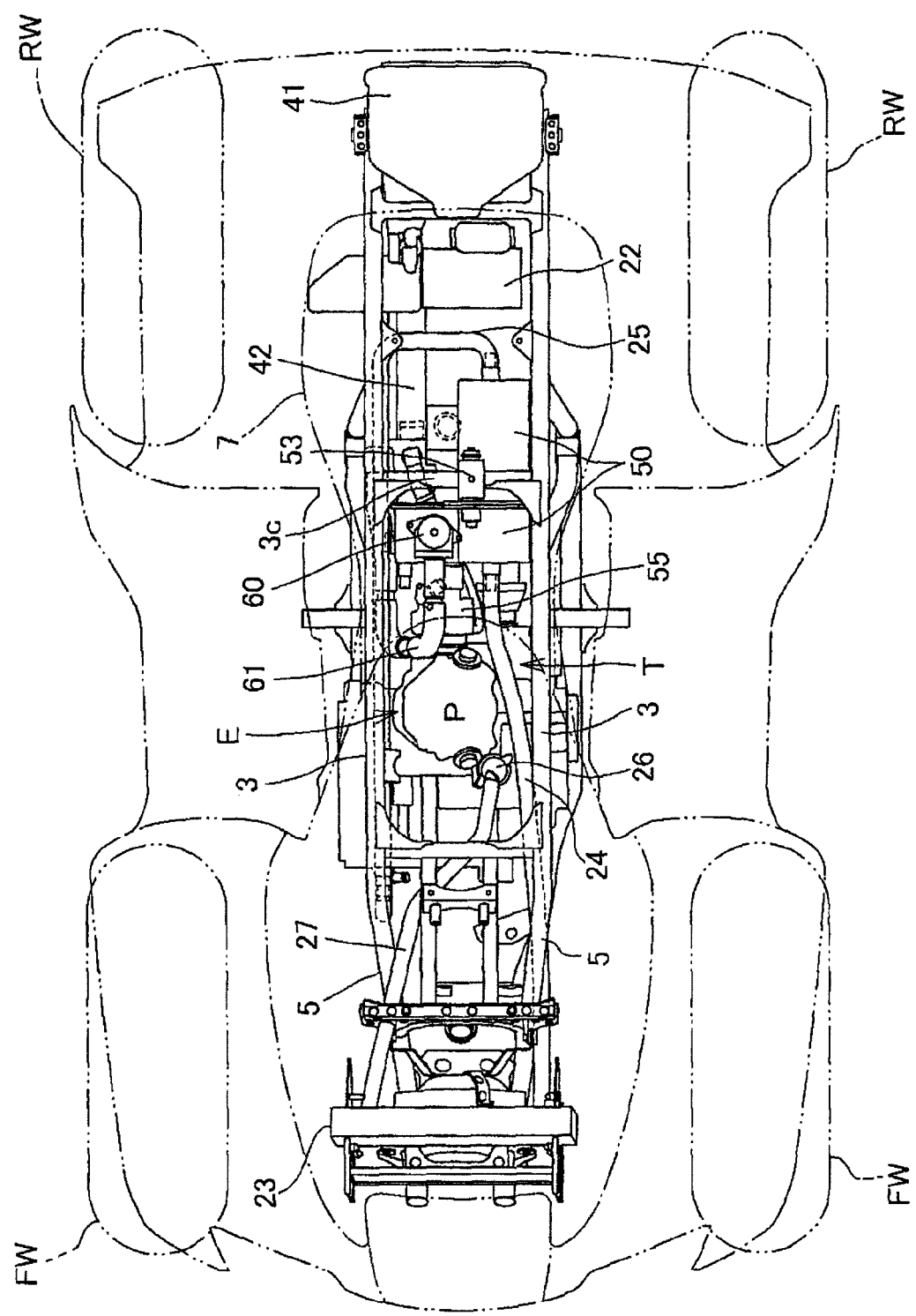
FIG. 2 is a plan view thereof.
Figure 3:
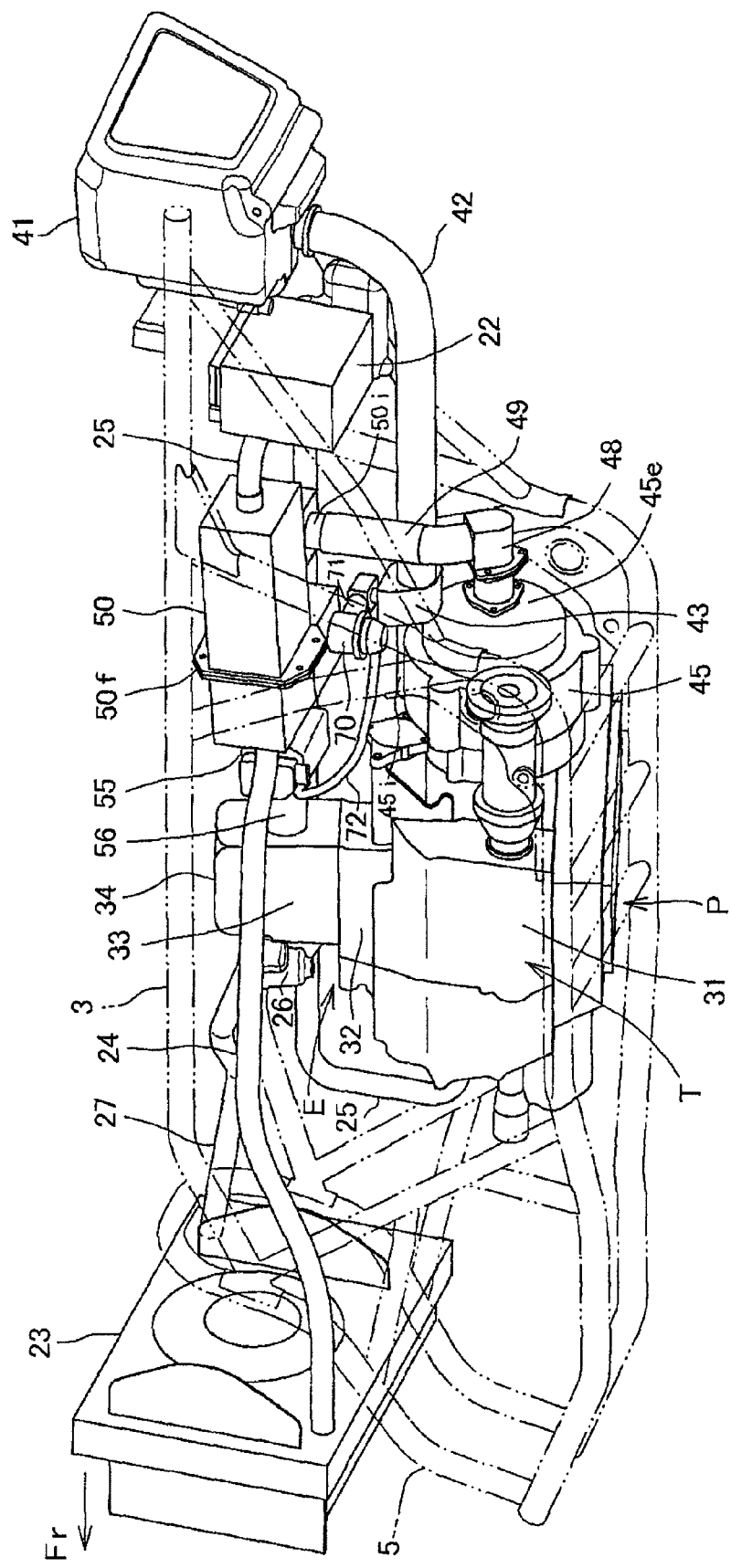
FIG. 3 is a perspective view illustrating chief parts of the supercharger-equipped internal combustion engine, and an inlet system and cooling system therefor.

FIGS. 1 and 2 respectively show a side view and a plan view of a rough terrain vehicle 1 provided with a supercharger-equipped internal combustion engine E according to this embodiment, with its vehicle body cover and the like detached.

Note that the front, rear, left and right directions in this embodiment are determined based on a vehicle oriented in an advancing direction.

The rough terrain vehicle 1 can be a saddle-ride type four-wheel vehicle. Left and right paired front wheels FW and left and right paired rear wheels RW are suspended at the front and rear of a vehicle body frame 2, respectively. A low-pressure balloon tire for rough terrain can be mounted on each wheel.

In the example, the vehicle body frame 2 is formed by joining various steel products. Left and right paired main frames 3, 3 extend in the front-to-rear direction from the front to rear of the vehicle body. Center frame parts 4, 4 each have a frame in the form of parallelogram, in the side view, using the center part of the corresponding main frame 3 as its upper side. The center frame parts 4, 4 support a power unit P which integrally includes the combustion engine E and a transmission T in a crankcase 31.

In this embodiment, front frame parts 5, 5 are coupled to the respective front parts of the main frames 3, 3 and to the respective front parts of the center frame parts 4, 4. The front wheels FW are suspended from the respective front frame parts 5, 5.

The rear parts of the main frames 3, 3, which support a saddle seat 7, are supported by rear frame parts 6, 6 each provided between each of the rear parts of the main frames 3, 3 and the corresponding one of the lower rear ends of the center frame parts 4, 4.

The left and right sides of the vehicle body frame 2 are integrally formed with their certain points joined by cross members.

A pivot plate 8 is fixed to a curved part located at the lower rear end of each center frame part 4. A swing arm 9 is swingably provided to the pivot plate 8 with its front end axially supported by the pivot plate 8. A rear cushion 10 is provided between the rear part of the swing arm 9 and the main frame 3. A rear final reduction gear unit 19 is provided to the rear end of the swing arm 9, and the rear wheel RW is suspended from the corresponding rear final reduction gear unit 19.

The cross member bridged between the left and right front frame parts 5, 5 supports a steering column 11 at the center, in a vehicle width direction, of the cross member. A steering handlebar 13 is coupled to the upper end of a steering shaft 12 which is steerably supported by the steering column 11. The lower end of the steering shaft 12 is coupled to a front wheel steering mechanism 14.

In this example, the internal combustion engine E of the power unit P is a water-cooled, single-cylinder internal combustion engine, is equipped with a supercharger 45, and is mounted on the center frame parts 4, 4 with its crankshaft 20 oriented in the front-to-rear direction of the vehicle body, i.e., with its crankshaft 20 longitudinally disposed. Other engine/cylinder configurations could also be used.

The transmission T of the power unit P is arranged at the left side of the internal combustion engine E. From the transmission T at the left side, an output shaft 15 oriented in the front-to-rear direction protrudes in the front-rear direction. The output shaft 15 transmits its rotational force from its front end to the left and right front wheels FW through a front drive shaft 16 and a front final reduction gear unit 17, and from its rear end to the left and right rear wheels RW through a rear drive shaft 18 and the rear final reduction gear unit 19.

Above the power unit P, a fuel tank 21 is laid between and supported on the main frames 3, 3 of the vehicle body frame 2 at their front parts. A battery 22 is hung from the main frames 3, 3 at their rear parts. The front frame parts 5, 5 support a radiator 23 at their front parts.

Moreover, this embodiment includes an air cleaner 41 which is laid between and supported on the rear ends of the main frames 3, 3 at a position posterior to the battery 22.

At the rear side of the crankcase 31 of the internal combustion engine E, the supercharger 45 is provided behind the crankshaft 20 which is placed slightly to the right of the vehicle center.

The internal combustion engine E is installed upright while inclining slightly to the left, and has the crankcase 31, a cylinder block 32, a cylinder head 33, and a cylinder head cover 34 which are stacked in this order. A short intake pipe 56 extending rearward from the cylinder head 33 is connected to a throttle body 55. An intercooler 50 is installed immediately behind the throttle body 55 so that these two may be close to each other. The throttle body 55 and the intercooler 50 can be connected with a short intake connection pipe 54.

In this manner, the throttle body 55 and the intercooler 50 can be connected, in this order in the front-to-rear direction, to the intake pipe 56 extending rearward from the cylinder head 33 protruding substantially upward from the crankcase 31. The throttle body 55 and the intercooler 50 are accommodated in a space between the left and right main frames 3, 3 in the plan view (see FIGS. 2 and 4), and are located under the saddle seat 7 (see FIGS. 1, 5 and 7).

The battery 22 is, in this example, arranged behind the intercooler 50, and the air cleaner 41 is provided behind the battery 22. Consequently, the throttle body 55, the intercooler 50, the battery 22 and the air cleaner 41 are arranged in this order behind the cylinder head 33, so that all of them are accommodated within the space between the left and right main frames 3, 3 in the plan view.

The intercooler 50 has a case which is a divided structure divided into front and rear halves, and has a flange 50*f* formed at the joint surface of the halves. An attachment stay 53 formed by bending a rectangular plate material in a squared U-shape is fixed to the upper part of the flange 50*f*, and is attached to a cross member 3*c* bridged between the main frames 3, 3 in such a manner that the attachment stay 53 strides over the cross member 3*c*. In this way, the intercooler 50 can be hung from the cross member 3*c* below the main frames 3, 3.

Figure 5:
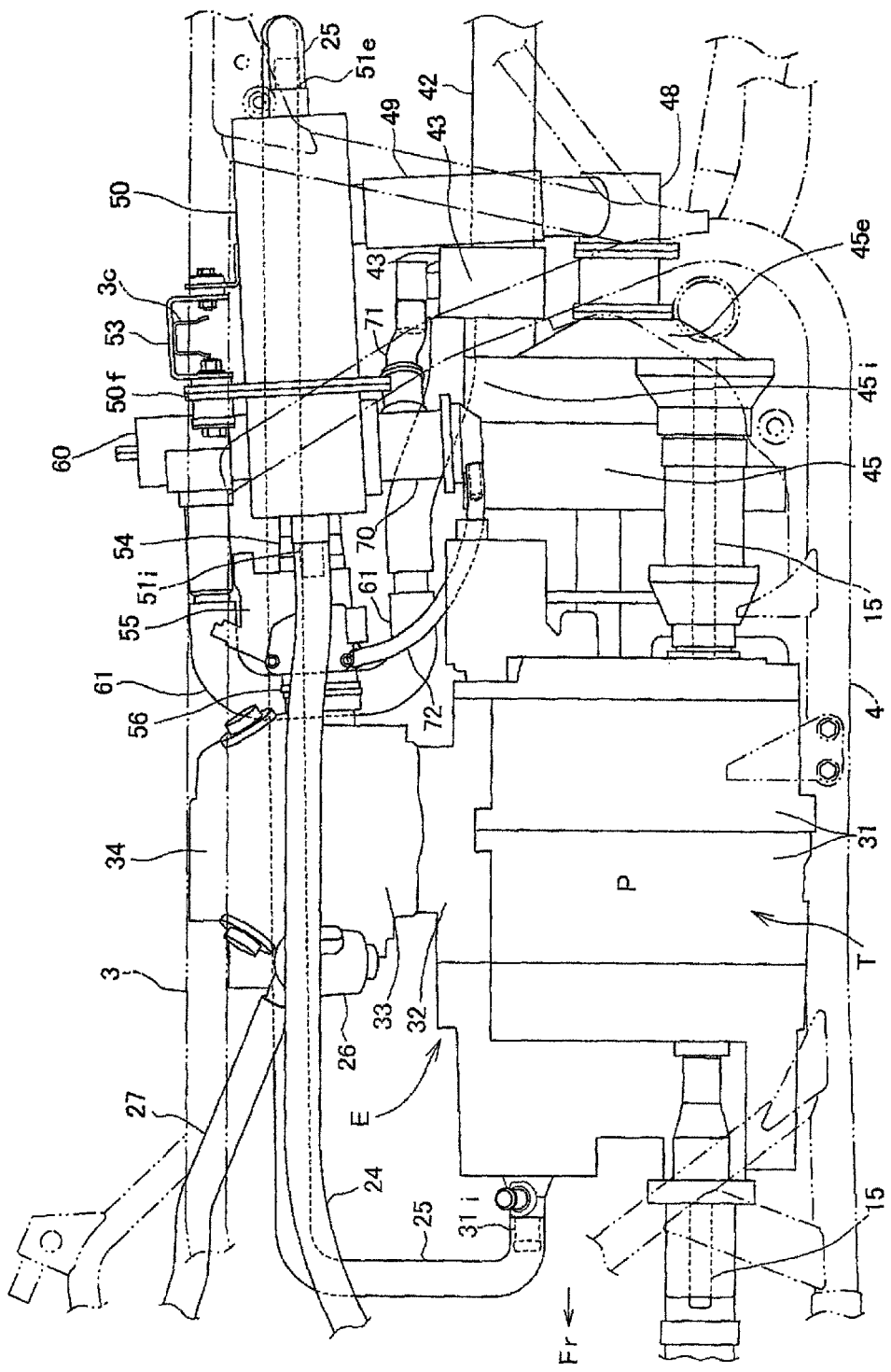
FIG. 5 is a left-side view illustrating the same.

The intercooler 50 is located above the supercharger 45, in this example, and is located at a height close to that of the lower surface of the main frame 3 in the side view (FIG. 5).

Figure 4:
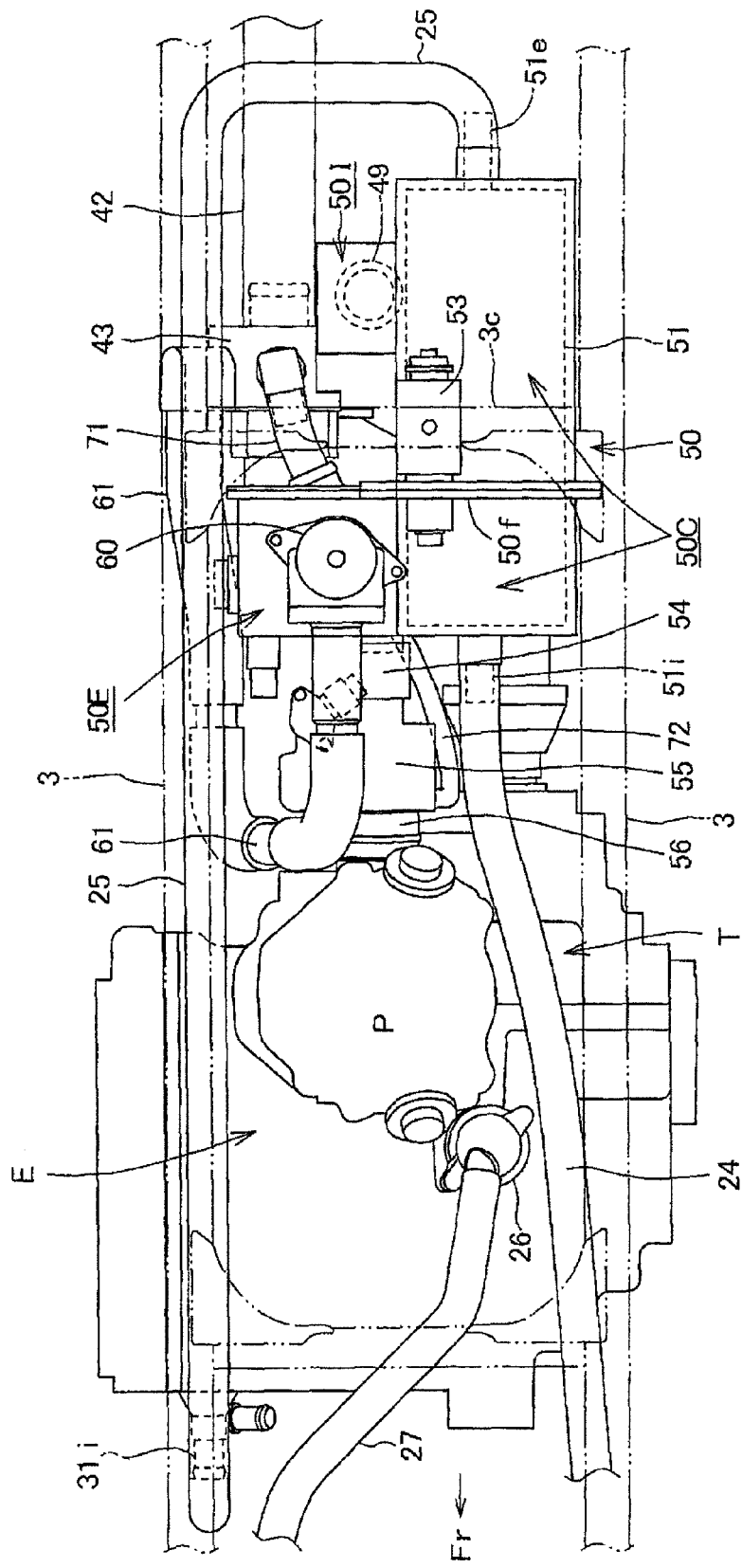
FIG. 4 is a plan view illustrating the same.

As shown in the exemplary plan view of FIG. 4, the intercooler 50 is accommodated within the space between the left and right main frames 3, 3. A rectangular container which is long in the front-to-rear direction and which is placed on the left half of the space constitutes an intercooler core chamber 50C for accommodating an intercooler core 51. A rectangular container formed by protruding the rear part of the intercooler core chamber 50C in the right direction constitutes an inlet expansion chamber 50I; a rectangular container formed by protruding the front part of the intercooler core chamber 50C in the right direction constitutes an outlet expansion chamber 50E.

An outlet connection pipe 50*e* protrudes forward from the outlet expansion chamber 50E. The intake connection pipe 54 is connected to the outlet connection pipe 50*e* at its rear end, and is connected to the throttle body 55 at its front end.

An inlet connection pipe 50*i* protrudes downward from the inlet expansion chamber 50I. A discharge connection pipe 48 protrudes rearward from a discharge port 45*e* which is located at the rear part of the supercharger 45 located below the inlet expansion chamber 50I. The inlet connection pipe 50*i* and the discharge connection pipe 48 are connected to each other with a coupling pipe 49.

In the intercooler 50, cooling water flows through a tube of the intercooler core 51 of the intercooler core chamber 50C. From the intercooler 50, an inlet port 51*i* for cooling water protrudes forward, and an outlet port 51*e* for the cooling water protrudes rearward.

A radiator hose 24 is connected at its rear end to the inlet port 51*i* protruding forward, and extends forward to be connected at its front end to the exit of cooling water in the radiator 23 provided at the front part of the vehicle body.

A cooling water hose 25 is connected to the outlet port 51*e* protruding rearward. The cooling water hose 25 bends to the right, thereafter bends forward, and then extends forward while passing through the right side of the intercooler 50, the throttle body 55, and the cylinder head 33 (see FIG. 4). Then, the cooling water hose 25 bends downward and runs round the front of the crankcase 31 so as to be connected to a cooling water inlet port 31*i* protruding from the front of the crankcase 31 (see FIG. 6).

A thermostat 26 is provided at the front left side of the cylinder head 33. Cooling water circulates from the crankcase 31 through the cylinder block 32 and the cylinder head 33, and is then introduced to the thermostat 26. A radiator hose 27 extends from the thermostat 26 to the radiator 23.

Figure 6:
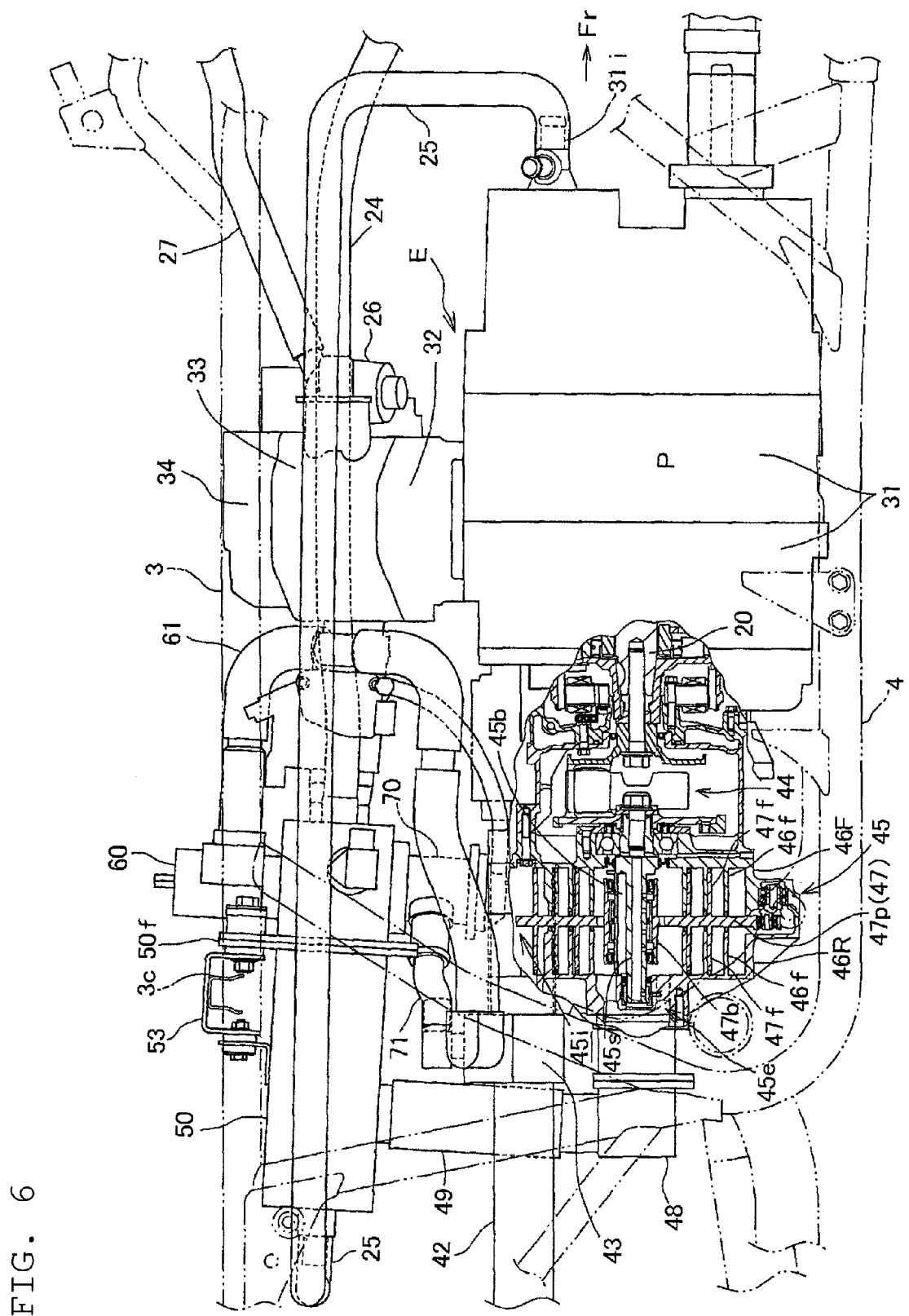
FIG. 6 is a right-side view illustrating the same.
Figure 7:
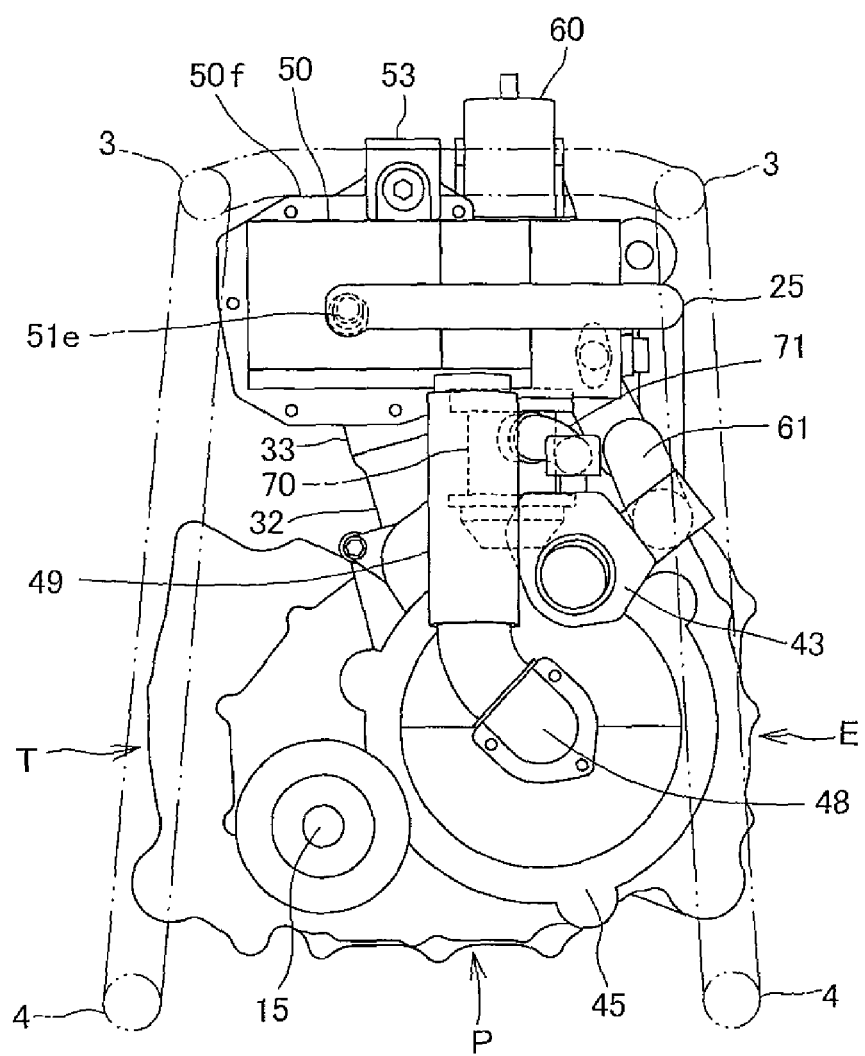
FIG. 7 is a rear view illustrating the same.

The supercharger 45 placed below the intercooler 50 is, in this example, a scroll compressor. Referring to FIG. 6, the rear end of the crankshaft 20 and a rotational driving shaft 45*s* of the scroll compressor are coupled to each other with a coupler 44 so that the crankshaft 20 and the rotational driving shaft 45*s* can be coaxial. The coupler 44 is attached to the crankshaft 20 and the rotational driving shaft 45*s* with a rubber elastic member interposed in between. The supercharger 45 sucks clean air, which has passed through the air cleaner 41, via an intake coupling pipe 42 and an inlet port 45*i*; takes in the clean air into the scroll compressor; compresses the clean air; and sends the compressed air to the intercooler 50 by way of the discharge port 45*e* located at a center region, the discharge connection pipe 48, and then the coupling pipe 49.

The shell body of the supercharger (scroll compressor) 45 is formed of front and rear paired fixed scrolls 46F and 46R facing each other. A swirling scroll 47 is provided between the front and rear fixed scrolls 46F and 46R.

The front fixed scroll 46F is fixed to the crankcase 31, and the rear fixed scroll 46R is fixed to the front fixed scroll 46F.

The front and rear fixed scrolls 46F and 46R have respective whirling blades 46*f*, 46*f* which are facing each other with the tips of the blades directed inward. The swirling scroll 47 has a circular plate 47*p* extending like a flange around a cylindrical boss part 47*b* fitted around the rotational driving shaft 45*s*. Whirling blades 47*f*, 47*f* are formed at the front and rear of the circular plate 47*p*. The swirling scroll 47 is built up so that the whirling blades 47f, 47f may engage with the whirling blades 46f, 46f of the fixed scrolls 46F and 46R and thereby may be swirled.

The rotational driving shaft 45s is provided with an eccentric shaft part 45b. The eccentric shaft part 45b is in contact with the inner periphery of the cylindrical boss part 47b with a bearing interposed therebetween, the cylindrical boss part 47b being located at the center of the swirling scroll 47. Thereby, the eccentric shaft part 45b supports and eccentrically drives the swirling scroll 47.

Three places on the outer periphery of the circular plate 47p of the swirling scroll 47 are supported to be eccentrically driven. Thus, the swirling scroll 47 does not rotate by itself but is rotated with the rotation of the fixed scrolls 46F and 46R. In this way, the scroll compressor compresses air taken inside.

In sum, the rotation of the crankshaft 20 rotates and drives, via the coupler 44, the coaxial rotational driving shaft 45s of the supercharger 45 at the same speed as that of the rotation of the crankshaft 20 to swirl the swirling scroll 47. Thereby, the scroll compressor takes in air through the inlet port 45i by the swirl of the swirling scroll 47, compresses the air, and discharges compressed air through the discharge port 45e.

The supercharger 45 described above has the inlet port 45i at its upper part, and has the discharge port 45e behind the driving shaft.

A connection joint 43 is coupled to the anterior opening of the inlet port 45i. The intake coupling pipe 42 extends rearward from the connection joint 43, passes through the right side of the coupling pipe 49, passes under the battery 22, and then bends upward to be connected to the air cleaner 41.

A description will be given of the flow of air in the inlet system for the supercharger-equipped internal combustion engine E. First, air purified in the air cleaner 41 located at the rear part of the vehicle body flows forward through the intake coupling pipe 42, and enters the supercharger 45 from the inlet port 45i via the connection joint 43. Subsequently, the air compressed in the supercharger 45 is discharged from the discharge port 45e, and flows upward through the coupling pipe 49 via the discharge connection pipe 48 so as to enter the inlet expansion chamber 50I of the intercooler 50. Next, the air heated by the compression moves from the inlet expansion chamber 50I to the intercooler core chamber 50C so as to be cooled in the intercooler core chamber 50C. Then, the air thus cooled moves to the outlet expansion chamber 50E, and is sent from the outlet expansion chamber 50E to the throttle body 55 via the intake connection pipe 54 so as to allow the throttle body 55 to adjust therein the amount of air to be taken into the engine. Thereafter, the air thus adjusted is supplied to the intake port of the cylinder head 33 and to the combustion chamber of the internal combustion engine E via the intake pipe 56.

The intercooler 50 is formed of the intercooler core chamber 50C housing the intercooler core 51, and the inlet expansion chamber 50I and the outlet expansion chamber 50E each serving as an air chamber. Accordingly, it is possible to allow the intercooler 50 to also function as an air chamber, and thus to constantly send stably-pressurized air to the internal combustion engine E.

A pressure regulating valve 60 is provided in a protruding manner above the outlet expansion chamber 50E of the intercooler 50. An air return pipe 61 extends forward from the pressure regulating valve 60, bends downward, and then extends downward between the cylinder head 33 and the throttle body 55 along the right side of an intake pipe 56. Thereafter, the air return pipe 61 bends rearward and extends rearward between the outlet expansion chamber 50E and the supercharger 45. Thereby, the air return pipe 61 reaches the connection joint 43 located upstream of the supercharger 45, and connects at its one end to the connection joint 43.

The pressure regulating valve 60 allows air in the outlet expansion chamber 50E to return to the upstream of the supercharger 45 through the air return pipe 61, by opening when the pressure of the air in the outlet expansion chamber 50E is a predetermined pressure (40 kPa, for example) or higher.

In the supercharger 45, the rotational driving shaft 45s is coaxially coupled to the crankshaft 20 with the coupler 44 and is thus driven at the same speed as that of the crankshaft 20. For this reason, an excessively high pressure may be applied to the inside of the intercooler 50. In order to protect the intercooler 50 and the supercharger 45 from the excessively high pressure, the pressure regulating valve 60 acts to prevent the pressure of air in the outlet expansion chamber 50E from exceeding the predetermined pressure. Specifically, the pressure regulating valve 60 opens to return the air to the upstream of the supercharger 45 when the pressure is the predetermined pressure or higher.

A recirculation valve 70 is provided to protrude from below the outlet expansion chamber 50E of the intercooler 50, i.e., in a direction opposite to that of the pressure regulating valve 60. An air return pipe 71 extends obliquely rearward from the recirculation valve 70 so as to reach the connection joint 43 located upstream of the supercharger 45, and connects at its one end to the connection joint 43.

In this example, a negative-pressure detecting pipe 72 couples the operating part of the recirculation valve 70 to the downstream side of the throttle body 55.

The recirculation valve 70 is used to keep an air pressure in the intercooler 50 low in the following manner. Specifically, in response to the close of the throttle valve of the throttle body 55, a negative pressure on the downstream side of the throttle body 55 acts on the operating part of the recirculation valve 70 via the negative-pressure detecting pipe 72, so that the recirculation valve 70 is opened. Thereby, the recirculation valve 70 returns air in the outlet expansion chamber 50E to the upstream of the supercharger 45 via the air return pipe 71. This makes it possible to prevent air from being supercharged when the engine is idled.

As described above, both of the pressure regulating valve 60 and the recirculation valve 70 are provided to the outlet expansion chamber 50E of the intercooler 50 from which these valves take out air to be returned to the upstream of the supercharger 45. This makes it possible to simplify the air return passage, and thus to simplify the layout of the inlet system.

In the supercharger-equipped internal combustion engine E, the supercharger 45 is arranged behind the crankcase 31. The throttle body 55 is connected to the intake pipe 56 which extends rearward from the cylinder head 33 protruding substantially upward from the crankcase 31. In addition, the intercooler 50 is connected to the intake connection pipe 54 extending rearward from the throttle body 55. In this example, therefore, the throttle body 55 and the intercooler 50 are connected, in this order in the front-to-rear direction, behind the internal combustion engine E and below the saddle seat 7. In this way, the supercharger 45, the throttle body 55 and the intercooler 50 are collectively arranged behind the main body of the internal combustion engine E. This reduces the width of the supercharger-equipped internal combustion engine E in the left-to-right direction. Consequently, the supercharger-equipped internal combustion engine E can be accommodated in a space of the saddle seat 7 of the rough terrain vehicle 1, the space being narrow in the left-to-right direction.

Since the space of the saddle seat 7 is narrow in the left-to-right direction, a driver does not need to sit down with his/her legs wide apart when straddling the saddle seat 7, and thus easily takes a stable sitting posture in riding on the saddle.

The throttle body 55 and the intercooler 50 are connected, in this order in the front-to-rear direction, to the intake pipe 56 extending rearward from the cylinder head 33 so as to be adjacent to each other. This suppresses an increase in the length in the front-to-rear direction of the supercharger-equipped internal combustion engine E as much as possible, and thereby enables a reduction in the size of the supercharger-equipped internal combustion engine E.

Furthermore, the intercooler 50 is arranged in a dead space which is formed behind the crankshaft 20 of the internal combustion engine E, under the saddle seat 7 and above the supercharger 45. This makes it possible to further reduce the length in the front-to-rear direction as well as the width in the left-to-right direction, of the supercharger-equipped internal combustion engine E.

EXPLANATION OF THE REFERENCE NUMERALS

P POWER UNIT
E INTERNAL COMBUSTION ENGINE
T TRANSMISSION
FW FRONT WHEEL
RW REAR WHEEL
1 ROUGH TERRAIN VEHICLE
2 VEHICLE BODY FRAME
3 MAIN FRAME
4 CENTER FRAME PART
5 FRONT FRAME PART
6 REAR FRAME PART
15 OUTPUT SHAFT
20 CRANKSHAFT
21 FUEL TANK
22 BATTERY
23 RADIATOR
24 RADIATOR HOSE
25 COOLING WATER HOSE
26 THERMOSTAT
27 RADIATOR HOSE
31 CRANKCASE
32 CYLINDER BLOCK
33 CYLINDER HEAD
34 CYLINDER HEAD COVER
41 AIR CLEANER
42 INTAKE COUPLING PIPE
43 CONNECTION JOINT
44 COUPLER
45 SUPERCHARGER (SCROLL COMPRESSOR)
46F FRONT FIXED SCROLL
46R REAR FIXED SCROLL
47 SWIRLING SCROLL
48 DISCHARGE CONNECTION PIPE
49 COUPLING PIPE
50 INTERCOOLER
50C INTERCOOLER CORE CHAMBER
50E OUTLET EXPANSION CHAMBER
50I INLET EXPANSION CHAMBER
51 INTERCOOLER CORE
54 INTAKE CONNECTION PIPE
55 THROTTLE BODY
56 INTAKE PIPE
60 PRESSURE REGULATING VALVE
61 AIR RETURN PIPE
70 RECIRCULATION VALVE
71 AIR RETURN PIPE
72 NEGATIVE-PRESSURE DETECTING PIPE

We claim:

1. An internal combustion engine for a saddle-ride type vehicle, comprising:
   a crankcase;
   a supercharger disposed entirely behind the crankcase in a front-to-rear direction of a vehicle body; and
   a throttle body and an intercooler connected in the front-to-rear direction, to an intake passage of the engine, said intake passage extending directly rearward, directly from a cylinder head, said cylinder head protruding substantially upward from the crankcase,
   wherein the throttle body and the intercooler are connected in this order in the front-to-rear direction, the intercooler is configured between the throttle body on one side thereof and an air cleaner on another side thereof, the intercooler is disposed between left and right paired frames of a vehicle body frame of the vehicle body, with the left and right paired frames being oriented in the front-to-rear direction of the vehicle, the left and right paired frames extend in the front-to-rear direction of the vehicle body, center frame parts and the left and right paired frames form at least one parallelogram, in a side view, and the left and right paired frames and the center frame parts surround the supercharger and the throttle body.

2. The internal combustion engine according to claim 1, wherein the throttle body is located downstream of the intercooler, and wherein the air cleaner is located upstream from the intercooler.

3. The internal combustion engine according to claim 1, wherein the supercharger comprises a scrolled compressor, and is disposed behind a crankshaft of the internal combustion engine, and wherein the intercooler is disposed above the supercharger.

4. The internal combustion engine according to claim 1, wherein the intercooler comprises an intercooler core chamber housing an intercooler core therein, and an expansion chamber, wherein said expansion chamber functions as an air chamber.

5. The internal combustion engine according to claim 4, wherein the expansion chamber comprises:
   a pressure regulating valve configured to return air from the expansion chamber to a point upstream of the supercharger when an air inlet pressure between the supercharger and throttle body meets or exceeds a predetermined value; and
   a recirculation valve configured to return air from the expansion chamber to the point upstream of the supercharger upon closure of a throttle valve of the throttle body.

6. An internal combustion engine for a vehicle, comprising:
   crankcase means for housing engine components therein;
   supercharger means for compressing intake air, said supercharger means disposed entirely behind the crankcase means in a front-to-rear direction of a vehicle body;
   throttle-body means for controlling intake air to the internal combustion engine; and
   intercooler means for cooling the intake air, said throttle body means and said intercooler means connected in the front-to-rear direction, to an intake passage of the engine, wherein said intake passage extends directly rearward, directly from a cylinder head, said cylinder head protruding substantially upward from the crankcase means, wherein the throttle body means and the intercooler means are connected in this order in the front-to-rear direction, the intercooler means is disposed between the throttle body means on one side thereof and an air cleaner means for cleaning intake air on another side thereof, the intercooler is disposed between left and right paired frames of a vehicle body frame of the vehicle body, the left and right paired frames extend in the front-to-rear direction of the vehicle body, center frame parts and the left and right paired frames form at least one parallelogram, in a side view, and the left and right paired frames and the center frame parts surround the supercharger and the throttle body.

7. The internal combustion engine according to claim 1, wherein the throttle body and the intercooler are disposed below a saddle seat of the vehicle.

8. The internal combustion engine according to claim 6, wherein the throttle body means is disposed downstream of the intercooler means, and wherein the air cleaner means is disposed upstream from the intercooler means.

9. The internal combustion engine according to claim 6, wherein the supercharger means comprises scrolled compressor means for compressing the intake air, and wherein the supercharger means is disposed behind a crankshaft of the internal combustion engine, and wherein the intercooler means is disposed above the supercharger means.

10. The internal combustion engine according to claim 6, wherein the intercooler means comprises an intercooler core chamber housing an intercooler core therein, and an expansion chamber, wherein said expansion chamber functions as an air chamber.

11. The internal combustion engine according to claim 10, wherein the expansion chamber comprises:

pressure regulating means for regulating air pressure, said pressure regulating means also for returning air from the expansion chamber to a point upstream of the supercharger means when an air inlet pressure between the supercharger means and the throttle body means meets or exceeds a predetermined value; and recirculation means for returning air from the expansion chamber to the point upstream of the supercharger means upon closure of a throttle valve of the throttle body.

12. The internal combustion engine according to claim 6, wherein the throttle body means and intercooler means are disposed below a saddle seat of the vehicle.

* * * * *